(12) United States Patent
Schmidt et al.

(10) Patent No.: US 8,459,874 B2
(45) Date of Patent: Jun. 11, 2013

(54) ASSEMBLY AND METHOD FOR MOUNTING A PUMP BEARING IN/ON PLASTIC COOLANT PUMP HOUSINGS

(75) Inventors: Eugen Schmidt, Merbelsrod/Thüringen (DE); Frank Blaurock, Schleusingerneundorf/Thüringen (DE); Hartmut Leusenrink, Hildburghausen/Thüringen (DE)

(73) Assignee: Geräte—und Pumpenbau GmbH Dr. Eugen Schmidt, Merbelsrod/Thüringen (DE)

( * ) Notice: Subject to any disclaimer, the term of this patent is extended or adjusted under 35 U.S.C. 154(b) by 738 days.

(21) Appl. No.: 11/922,638

(22) PCT Filed: Jun. 13, 2006

(86) PCT No.: PCT/DE2006/001010
§ 371 (c)(1),
(2), (4) Date: Dec. 20, 2007

(87) PCT Pub. No.: WO2007/003153
PCT Pub. Date: Jan. 11, 2007

(65) Prior Publication Data
US 2009/0245707 A1    Oct. 1, 2009

(30) Foreign Application Priority Data
Jun. 30, 2005   (DE) .......................... 10 2005 030 424

(51) Int. Cl.
*F16C 43/00*    (2006.01)
*B21D 53/10*    (2006.01)

(52) U.S. Cl.
USPC ...................... 384/537; 29/898.07; 29/898.11

(58) Field of Classification Search
USPC .... 384/537, 584, 585, 559, 903, 906; 29/447, 29/898.07, 898.11
See application file for complete search history.

(56) References Cited

U.S. PATENT DOCUMENTS 4,429,927 A * 2/1984 Kawabata ..................... 384/585
4,594,204 A * 6/1986 Heidenreich et al. ......... 264/492

(Continued)

FOREIGN PATENT DOCUMENTS

DE    197 20 286    11/1998
DE    103 00 611    7/2004

(Continued)

OTHER PUBLICATIONS

International Search Report.

*Primary Examiner* — James Pilkington
(74) *Attorney, Agent, or Firm* — Collard & Roe, P.C.

(57) ABSTRACT

The assembly includes a pump bearing ring that is fitted with at least one bearing groove and is disposed in/on a bearing seat of a plastic coolant pump housing with an axial bearing collar, and several positioning webs which are located on the bearing seat. Separate adhesive grooves are placed between the positioning webs and the bearing collar. The adhesive grooves are provided with liquid-tight walls in four of the axial directions, an opening in the direction of the pump bearing ring, and slot-shaped adhesive pockets in the area of the outer edge of the pump bearing. A method for mounting a pump bearing in/on a plastic coolant pump housing includes steps of spreading adhesive on a bearing ring, pressing the bearing ring into/onto the bearing seat, and inductively heating the pump bearing in the plastic coolant pump housing.

1 Claim, 2 Drawing Sheets

U.S. PATENT DOCUMENTS

| | | | |
|---|---|---|---|
| 4,810,108 A * | 3/1989 | Yajima | 384/488 |
| 4,854,750 A * | 8/1989 | Lavin | 384/500 |
| 5,489,404 A * | 2/1996 | LeGrand et al. | 264/481 |
| 5,527,115 A * | 6/1996 | Zepp et al. | 384/537 |
| 5,765,950 A | 6/1998 | Eno et al. | |
| 6,817,772 B2 | 11/2004 | Schmidt et al. | |

FOREIGN PATENT DOCUMENTS

| | | |
|---|---|---|
| GB | 685 455 | 1/1953 |
| GB | 1 437 532 | 5/1976 |

* cited by examiner

ASSEMBLY AND METHOD FOR MOUNTING A PUMP BEARING IN/ON PLASTIC COOLANT PUMP HOUSINGS

CROSS REFERENCE TO RELATED APPLICATIONS

Applicants claim priority under 35 U.S.C. §119 of German Application No. 10 2005 030 424.9 filed Jun. 30, 2005. Applicants also claim priority under 35 U.S.C. §365 of PCT/DE2006/001010 filed Jun. 13, 2006. The international application under PCT article 21(2) was not published in English.

BACKGROUND OF THE INVENTION

1. Field of the Invention

The invention relates to an assembly and a method for mounting a pump bearing in/on plastic coolant pump housings.

2. The Prior Art

In the prior art, coolant pumps having plastic housings are previously described.

In the case of these designs, the pump bearing is positioned into an injection-molding die before injection molding, and integrated into the plastic housing, in a secure position, during injection molding.

This variant of attaching the bearing has the disadvantages that the pump bearing is exposed to temperatures of up to 300° C. and thereby subjected to very great thermal stress.

During the cooling process, the bearing sleeves are then radially twisted in the plastic, and in this connection are often actually deformed.

In subsequent working steps, the bearings then have to be greased and sealed.

Aside from other increased production and installation effort connected with this, the coolant pumps having injection-molded pump bearings have the additional disadvantage that the bearings used as pump bearings must demonstrate relatively great bearing play, because of the twisting of the outer ring in the plastic, caused by the technology.

This great bearing play necessarily results in a great "unbalance," which makes it more difficult to provide the shaft seal that must be taken over by the shaft sealing ring, increases the installation effort, reduces the useful lifetime of the bearing, and furthermore causes increased running noises.

Another disadvantage of coolant pumps having a bearing injection-molded into the plastic housing is that these plastic housings cannot be tempered as a result of the integrated pump bearings, because the plastic is heated to 180° C. to 200° C. during tempering, so that the non-tempered plastics necessarily have a lesser strength as compared with tempered plastics.

Furthermore, it is not possible to separate the steel bearings injection-molded in from the plastic of the housing without destroying the housing, so that re-use of the bearing housings is precluded.

Furthermore, recycling of plastic housings having pump bearings injection-molded in is very cost-intensive, since separation of the bearings injection-molded in from the plastic of the housing necessarily requires an increased expenditure of time and/or labor.

On the other hand, bearing assemblies in plastic housings of coolant pumps are previously described, for example in DE 197 20 286 A1, in which the entire mantle surface of the pump bearing is glued into the related plastic housing.

In this connection, production and installation tolerances are predetermined by the adhesive gap between the plastic housing and the outer mantle of the bearing, which is required for transfer of the axial bearing stresses.

However, these production and installation tolerances that are necessarily required for the required adhesive gap significantly influence the sealing gap geometry between the impeller wheel and the related housing bore, and increase the leakage flow as a significant influence variable for the degree of effectiveness of the coolant pump, so that in the case of coolant pumps having pump bearings glued in (at justifiable production and/or installation effort), either only slight bearing stresses can be transferred to the pump housing, or the adhesive gaps are designed in such a manner that great bearing stresses can be transferred to the pump housing. However, these coolant pumps last mentioned then necessarily have a low degree of effectiveness.

In DE 103 00 611 A1, the applicant presented a bearing assembly for pump bearings in/on plastic coolant pump housings, having an axial bearing contact, that has already proven itself, in the meantime, in which a radial housing groove provided with an inlet bore is disposed in the coolant pump housing, on the one hand, and on the other hand, a bearing groove is made on the bearing ring to be disposed in the bearing seat, which groove lies opposite the housing groove in the final assembled state.

Then, for example, polyamide in the liquid state is introduced into the cavity formed between the coolant pump housing and the bearing ring, by the housing groove and the bearing groove, by way of the inlet bore.

After the polyamide has hardened, an injection-molded plastic ring that is connected both with the coolant pump housing and with the bearing ring forms in the cavity between the housing groove and the bearing groove.

However, this construction, which has already proven itself in practice, requires increased production effort for the production of the "adhesive ring," since the circumferential housing grooves and the bores required for "filling of these housing grooves" have to be mechanically made in the plastic housings subsequently, for the "production" of the adhesive ring.

The radial housing groove to be disposed in the plastic housing of the coolant pump brings about the result that the axle journal is weakened by the placement of this housing groove, so that under extreme belt loads, there is the risk of fracture at this location.

On the other hand, injection of the polyamide, by way of the inlet bore, into the ring-shaped interstice formed by housing groove and bearing groove, requires precise metering of the injection amount and, at the same time, precise monitoring of the filling process, since the polyamide can flow off axially in the direction of the shaft sealing ring, for example, and this can result in impairment of the ability of the radial sealing ring, i.e. the rotating mechanical seal, to function properly, among other things, or can cause incomplete filling of the ring groove, clearly restricting the desired axial and radial securing of the bearing in the plastic housing.

The placement of crosspieces in the bearing bore of the plastic housing, with crosspiece grooves lying between them, which was proposed in connection with the inlet bore and the housing groove in the dependent claims of the aforementioned application, did not result in the desired strength of the adhesive connection in practical implementation, however, since it was not possible to guarantee complete filling of the ring groove and the crosspiece grooves by the viscous adhesive. Therefore, only the solution with an inlet bore that empties into a ring groove was able to establish itself in practice.

As a result of the deficiencies of this solution as described above, it was therefore necessary to develop the mounting of pump bearings in/on plastic coolant pump housings further, in consistent manner.

SUMMARY OF THE INVENTION

The invention is therefore based on the task of developing an assembly that can be produced and installed in simple manner, as well as a method that is cost-advantageous and simple in terms of production technology, for mounting pump bearings in/on plastic coolant pump housings, which does not have the aforementioned disadvantages of the state of the art, allows tempering of the plastic housing and the use of bearings having little bearing play, as well as all the advantages that result from this, such as an increased useful lifetime, low noise development, stress relief of the shaft sealing ring, i.e. the rotating mechanical seal, and more, and furthermore guarantees bonding/adhesion strength between the pump bearing and the pump housing, over a large area and uniformly distributed, with minimal production and installation effort, at an optimal sealing gap geometry and a high degree of effectiveness of the pump, so that a great transfer of force from the pump bearing to the pump housing is guaranteed, without impairing the stability of the axle journal.

This task is accomplished, according to the invention, by means of the assembly according to the invention and the method according to the invention, for mounting a bearing ring (2) provided with at least one bearing groove (1), of a pump bearing (3), in/on a bearing seat (4) of a plastic coolant pump housing (5), in accordance with the characteristics of the independent claims of the invention.

It is characterizing, in this connection, that a bearing ring (2) provided with at least one bearing groove (1), of a pump bearing (3), in/on a bearing seat (4) of a plastic coolant pump housing (5), having an axial bearing collar (6), as well as several positioning crosspieces (7) disposed on the bearing seat (4), is characterized in that adhesive grooves (8) that are separated from one another, i.e. separate, are disposed between the positioning crosspieces (7) and the bearing collar (6), which are provided with liquid-tight walls (9) in four of the axis directions, in each instance, i.e. do not have any connection channels among each other, and have an opening only in the direction of the bearing ring (2) of the pump bearing (3), which ring is to be disposed above these adhesive grooves (8), and furthermore possess slot-shaped adhesive pockets (10) in the region of the outer edge of the pump bearing (3).

The positioning crosspieces (7) serve for simplification of the production and installation effort required for joining, since a bias that is not harmful for the pump bearing (3) becomes possible during installation, on the basis of the mantle surface of the bearing seat (4) that is structured with interruptions.

The "liquid-tight" adhesive grooves (8) worked in between the positioning crosspieces (7) guarantee uniform distribution of the adhesive during subsequent heating and hardening of the adhesive, in connection with the bearing groove(s) that connect(s) the adhesive grooves (8) with one another, so that a bonding/adhesion strength between the pump bearing and the pump housing, over a large area and uniformly distributed, is always guaranteed.

An adhesive reserve and, at the same time, an "open" connection of the adhesive grooves (8) with the surroundings of the coolant pump housing can be guaranteed by means of the adhesive pockets (10), so that optimal ventilation of all of the adhesive grooves (8) and of the bearing groove (1), and thus optimal filling of all of the adhesive joins, is guaranteed, and thereby an optimal force-fit adhesive connection of the bearing with the plastic housing can be brought about.

Another characteristic of the invention consists in the fact that the positioning crosspieces (7), with the adhesive grooves (8) disposed between them, can be disposed parallel to the axis direction of the pump bearing (3), at a slant to the axis direction of the pump bearing (3), and/or in an arc shape relative to the axis direction of the pump bearing (3).

The shape of the configuration of the positioning crosspieces (7) and the adhesive grooves (8) disposed between the positioning crosspieces (7) simplifies the production process by means of optimal unmolding during injection-molding, and furthermore allows a further increase of the bearing forces that can be transferred between the pump bearing (3) and the coolant pump housing (5).

According to the invention, first adhesive is applied to the cylinder surface and/or the bearing groove (1) of the bearing ring (2) and/or into/onto the bearing seat (4) provided with positioning crosspieces (7), in order to connect the pump bearing (3) with the plastic housing of the coolant pump.

In this connection, according to the invention, the adhesive can be applied to the outer mantle of the structural unit of the bearing assembly braced in a rotation device, for example by means of one or more metering syringes disposed next to one another and controlled with compressed air, in ring shape, precisely positioned, in predetermined amounts.

It is also essential to the invention that adhesive is also applied with uniform distribution, in precisely predetermined amounts, in the inner mantle of the other module of the bearing assembly to be joined to the aforementioned structural unit, by means of a slinging disk acted on by a metering syringe, which disk can be moved vertically in the vertically disposed ring mantle of this structural unit.

It is also characteristic that subsequently, the bearing ring (2) to be joined is "pressed" against this adhesive application metered according to the invention, until it makes contact with the bearing collar (3) in/on the bearing seat (4) formed by positioning crosspieces (7).

It is also in accordance with the invention, in this connection, that the pump bearing (3) disposed on/in the plastic coolant pump housing (5) and wetted with adhesive at the joining surfaces is subsequently heated inductively, by means of an induction coil disposed on the outer mantle of the join pairing, for approximately 2 to 10 seconds, with the adhesive pockets (10) directed upward. In this connection, the mantle of the pump bearing (3) is completely heated to a depth of approximately 0.8 to maximally 1.2 mm, to approximately 100° C. to 125° C., and thereby the adhesive being used liquefies in such manner that even the adhesive that remains in the adhesive pockets (10) during joining becomes "watery" and runs down into the adhesive grooves.

In this connection, the latter are completely filled, since a uniform "adhesive filling level" is brought about in all of the adhesive grooves (8) on the circumference of the bearing ring (2), by way of the bearing groove (1).

The ball bearing that is completely heated inductively, on the mantle, very rapidly gives off this heat towards the "inside," i.e. into the pump bearing, after the short period of inductive heating, so that the adhesive introduced into the adhesive joins, i.e. the adhesive grooves (8) and the bearing groove (1), does not foam up despite the temporarily high temperature of the mantle of the pump bearing, i.e. the boiling point of the adhesive is not exceeded in the adhesive joins.

At the same time, an optimal hardening temperature over the entire hardening time of the adhesive is achieved in this way.

After hardening of the adhesive according to the invention, for example of a heat-curing two-component adhesive, a uniformly distributed bonding/adhesion strength is guaranteed as a result of the solution according to the invention, at an optimal gap geometry and a high degree of effectiveness of the pump, because of the solution according to the invention, with the large-area adhesive grooves (8) that are completely filled with hardened adhesive, as a result of the solution according to the invention, together with the bearing groove (1) that surrounds these adhesive grooves (8), thereby making a high transfer of radial and axial forces from the pump bearing to the pump housing possible.

It is advantageous, since the bearing is connected with the coolant pump housing (5) only after injection molding, with minimal production and installation effort, that the material properties of the plastic housing can be clearly improved by means of tempering.

Since furthermore, only press fits have to be taken into consideration in dimensioning the fit between the bearing and the bearing seat of the coolant pump housing (5), but not adhesive gap dimensions, an optimal sealing gap geometry between the impeller wheel and the housing bore, and therefore a high degree of effectiveness of the pump, can always be guaranteed, with minimal production and installation effort.

Since the bearings are neither injection-molded in nor rigidly braced, according to the invention, and therefore deformation of the outer bearing rings of the pump bearings in the coolant pump housing (5) is avoided, pump bearings (3) having little bearing play and all of the advantages that result from this, such as stress relief of the shaft sealing ring, i.e. the rotating mechanical seal, an increased useful lifetime, low noise development, and more, for example, can be used as pump bearings.

As a result of the combination of the adhesive grooves (8) with the annular bearing groove (1) that is also filled with adhesive, not only is uniform filling of all of the adhesive grooves (8) guaranteed, but also both high radial forces and high axial forces can be transferred from the pump bearing (3) to the coolant pump housing (5), without problems.

Furthermore, simple disassembly of the pump bearing is possible by simply breaking the adhesive connection, so that in addition to the effort for production and installation, the effort for recycling can also be clearly reduced.

Additional details and characteristics of the invention are evident from the description of the exemplary embodiment according to the invention, in connection with the claims as well as the drawings relating to the solution according to the invention.

BRIEF DESCRIPTION OF THE DRAWINGS

In the following, the invention will therefore be explained in greater detail using an exemplary embodiment, in connection with two figures.

These figures show.

DETAILED DESCRIPTION OF THE PREFERRED EMBODIMENTS

Figure 1:
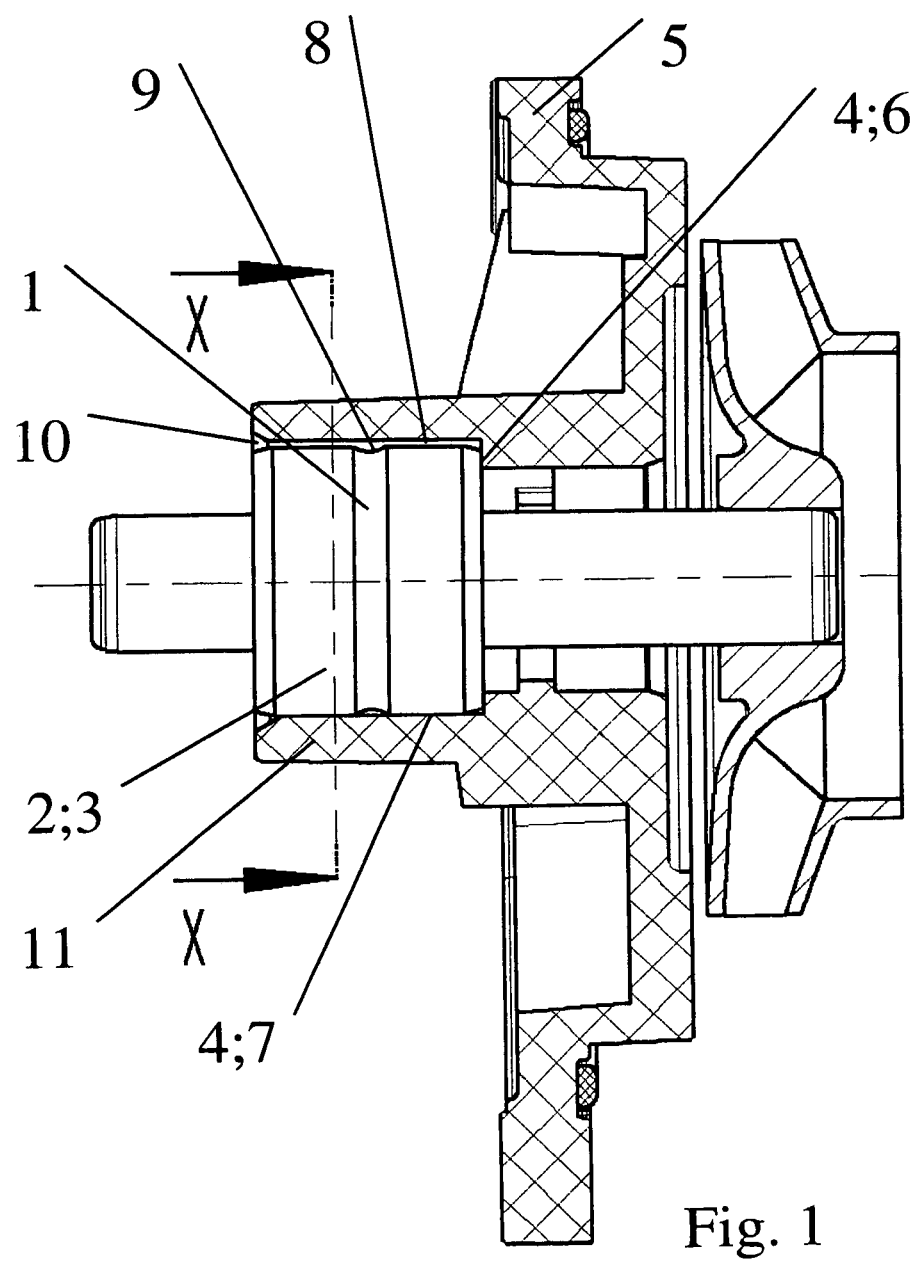
FIG. 1 a possible construction of the assembly according to the invention in a side view, in section.
Figure 2:
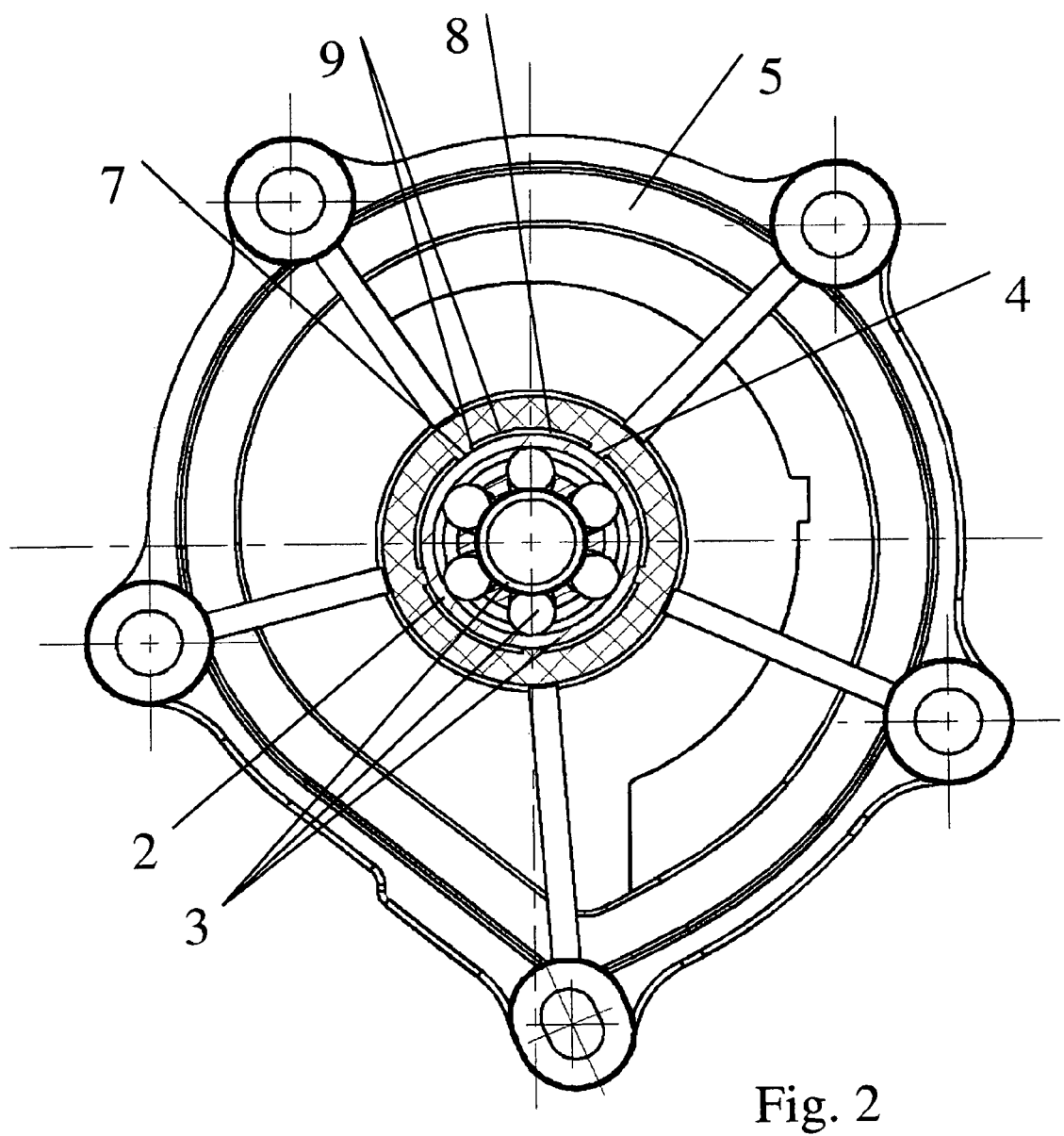
FIG. 2 the section at X-X, according to FIG. 1.

FIG. 1 shows one of the possible constructions of the assembly according to the invention in a side view, in section. FIG. 2 shows the related section at X-X, according to FIG. 1.

In this connection, a bearing ring 2 provided with at least one bearing ring groove 1, of a pump bearing 3, is disposed in a bearing seat 4 of a plastic coolant pump housing 5. The bearing seat 4 is formed by several positioning crosspieces 7 in connection with an axial bearing collar 6.

Adhesive grooves 8 that are separated from one another, i.e. separate, are disposed between the positioning crosspieces 7 and the bearing collar 6; they are provided with liquid-tight walls (9) in four of the axial directions, in each instance, i.e. they have no connection channels among each other.

Only above these adhesive grooves 8, i.e. in the region of the bearing ring 2 of the pump bearing 3 to be disposed there, and furthermore at the outer edge of the pump bearing 3, in the region of the slot-shaped adhesive pockets 10, are the adhesive grooves "open."

The positioning crosspieces 7 furthermore serve to simplify the production and installation effort required for joining, since a bias that is not harmful for the pump bearing 3 becomes possible during installation, on the basis of the mantle surface of the bearing seat 4 that is structured with interruptions. In this connection, the pump bearing 3 that rests in the bearing seat, i.e. against the bearing collar 6 and against the positioning crosspieces 7, seals off the adhesive grooves 8 that are connected with one another by way of the bearing groove 1, up to the adhesive pockets 10.

These adhesive grooves 8 according to the invention guarantee a large-area, maximal adhesive surface, always having the same size, with uniformly distributed adhesion strength, i.e. without any air inclusions, during subsequent heating and hardening of the adhesive, in connection with the bearing groove 1 that connects the adhesive grooves 8 with one another, so that a high transfer of force from the pump bearing 3 to the coolant pump housing is always guaranteed, without impairing the stability of the axle journal.

In this connection, an adhesive reserve, on the one hand, and furthermore, at the same time, an "open" connection of the adhesive grooves 8 with the surroundings of the coolant pump housing, is guaranteed by means of the adhesive pockets 10, so that optimal ventilation of all of the adhesive grooves 8 and of the bearing groove 1 can be guaranteed.

Furthermore, optimal filling of all of the adhesive joins and thereby an optimal force-fit adhesive connection of the bearing with the plastic housing is achieved by means of the adhesive pockets.

In the present exemplary embodiment, the positioning crosspieces 7 with the adhesive grooves 8 disposed between them are disposed parallel to the axis direction of the pump bearing 3.

To connect the pump bearing 3 with the plastic housing of the coolant pump, first a heat-curing two-component adhesive is applied both to the cylinder surface to be joined and to the bearing groove 1 of the bearing ring 2.

In this connection, this adhesive is applied by means of two metering syringes disposed next to one another and controlled with compressed air, onto the outer mantle of the structural unit of the pump bearing braced in a rotation device, which mantle is to be joined, in ring shape, and precisely metered.

At the same time, adhesive is applied with uniform distribution, in precisely predetermined amounts, on the inner mantle of the bearing seat 4 provided with positioning crosspieces 7, by means of a slinging disk acted on by a metering syringe, which disk can be moved vertically in the vertically disposed inner mantle.

Subsequent to this metered adhesive application according to the invention, the bearing ring 2 to be joined is pressed until it makes contact with the bearing collar 6 in/on the bearing seat 4 formed by positioning crosspieces 7.

Since the adhesive can only exit towards the top, because of the bearing collar that seals the adhesive grooves 8 off towards the bottom, the adhesive that exits when the bearing ring 2 (provided with adhesive in ring shape) is "pushed into" the bearing seat 4 wetted with adhesive collects in the adhesive pockets 10.

Subsequently, the module previously joined together, with the adhesive pockets 10 directed upward, is heated inductively for five seconds, by means of an induction coil disposed on the axle journal 11 of the coolant pump housing 5.

In this connection, the mantle of the pump bearing 3 is heated completely to a depth of approximately 2 mm, to 120° C., and when this is done, the heat-curing two-component adhesive that is used is liquefied in such a manner that the adhesive that has entered into the adhesive pockets 10 during joining becomes watery and runs into the adhesive grooves, thereby filling them completely, and leads to an "adhesive liquid level" that is uniform in all of the adhesive grooves 8, on the circumference of the bearing ring 2, by way of the bearing groove 1.

The ball bearing that has at first been inductively heated only "on the outside" now gives off the heat relatively quickly towards "the inside," after this short period of inductive heating, so that the adhesive introduced into the adhesive joins, i.e. the adhesive grooves 8 and the bearing groove 1, does not foam up despite the temporarily very high temperature at the mantle of the pump bearing, i.e. the boiling point of the adhesive is not exceeded in the adhesive joins.

At the same time, an optimal hardening temperature over the entire hardening time (of approximately 1 minute) of the adhesive is guaranteed by the heat amount stored in the ball bearing and "insulated" by the plastic housing, so that after hardening of the heat-curing two-component adhesive, a uniformly distributed bonding/adhesion strength is guaranteed as a result of the solution according to the invention, and a high transfer of force from the pump bearing to the pump housing is possible, as a result of the solution according to the invention, at an optimal sealing gap geometry and a high degree of effectiveness of the pump, without impairing the stability of the axle journal.

Since the bearing is connected with the coolant pump housing 5 only after injection molding, with minimal production and installation effort, it is also possible to clearly improve the material properties of the plastic housing by means of tempering.

Since only press fits have to be taken into consideration in dimensioning the fit between the bearing and the bearing seat of the coolant pump housing 5, but not adhesive gap dimensions, an optimal sealing gap geometry between the impeller wheel and the housing bore, and therefore a high degree of effectiveness of the pump, can be guaranteed with minimal production and installation effort.

Since, according to the invention, the bearings are furthermore neither injection-molded in nor rigidly braced, deformation of the outer bearing rings of the pump bearings in the coolant pump housing 5 is generally avoided, so that pump bearings 3 having little bearing play and all of the advantages that result from this, such as stress relief of the shaft sealing ring, i.e. the rotating mechanical seal, connected with slight bearing play, an increased useful lifetime, low noise development, and more, for example, can be used as pump bearings.

As a result of the combination of the "liquid-tight" adhesive grooves 8 according to the invention with the annular bearing groove 1 that is also filled with adhesive, not only can uniform filling of all of the adhesive grooves be guaranteed, but also, not only high radial forces but also high axial forces can be effortlessly transferred from the pump bearing 3 to the coolant pump housing 5.

Furthermore, simple disassembly of the pump bearing 3 is possible by means of defined breaking of the adhesive connection, so that in addition to the effort for production and installation, the effort for recycling can also be clearly reduced.

The invention claimed is:

1. A method for mounting a pump bearing comprising a bearing ring to a plastic coolant pump housing having an axial bearing collar and being provided with positioning crosspieces forming a bearing seat, the method comprising the steps of:
    applying a heat-hardening adhesive in a distributed manner, onto at least one of a cylinder surface of the pump bearing, a bearing groove of the bearing ring, and the bearing seat;
    subsequently pressing the bearing ring into the bearing seat until the bearing ring makes contact with the axial bearing collar so that the pump bearing and the plastic coolant pump housing radially overlap each other; and
    subsequently inductively heating the pump bearing for approximately 2 to 10 seconds, with adhesive pockets of the plastic coolant pump housing being directed upward whereby a mantle of the pump bearing is completely heated to a depth of approximately 0.8 mm to maximally 1.2 mm, to approximately 100° C. to 125° C. in order to guarantee optimal hardening of the adhesive.

* * * * *